United States Patent [19]
Fosse et al.

[11] Patent Number: 6,001,754
[45] Date of Patent: Dec. 14, 1999

[54] OPAL GLASS COMPOSITIONS

[75] Inventors: Lucien Fosse, Etalondes; Claude Avisse, Mers Les Bains, both of France

[73] Assignee: Saint-Gobain Emballage, Courbevoie, France

[21] Appl. No.: 09/011,201

[22] PCT Filed: Jun. 13, 1997

[86] PCT No.: PCT/FR97/01059

§ 371 Date: May 15, 1998

§ 102(e) Date: May 15, 1998

[87] PCT Pub. No.: WO97/47562

PCT Pub. Date: Dec. 18, 1997

[30] Foreign Application Priority Data

Jun. 14, 1996 [FR] France .................................. 96 07431

[51] Int. Cl.$^6$ .................................................. C03C 3/093
[52] U.S. Cl. .............................. 501/32; 501/63; 501/64; 501/67
[58] Field of Search ................................ 501/32, 67, 63, 501/64

[56] References Cited

U.S. PATENT DOCUMENTS

| 3,498,801 | 3/1970  | Keul ........................................... 501/32 |
| 4,298,390 | 11/1981 | Flannery et al. ........................... 501/32 |
| 4,309,219 | 1/1982  | Flannery et al. ........................... 501/59 |
| 4,469,799 | 9/1984  | Dumbaugh, Jr. ........................... 501/59 |
| 4,536,480 | 8/1985  | Flannery et al. ........................... 501/63 |
| 4,536,481 | 8/1985  | Flannery et al. ........................... 501/61 |
| 5,432,130 | 7/1995  | Rheinberger et al. .................... 501/32 |
| 5,591,683 | 1/1997  | Stempin et al. ........................... 501/32 |

FOREIGN PATENT DOCUMENTS

| 1453996    | 12/1966 | France . |
| 2221410    | 10/1974 | France . |
| 61-247642  | 11/1986 | Japan . |
| 254738     | 3/1970  | U.S.S.R. . |
| 642264     | 1/1977  | U.S.S.R. . |
| 9606052    | 2/1996  | WIPO . |

*Primary Examiner*—Karl Group
*Attorney, Agent, or Firm*—Oblon, Spivak, McClelland, Maier & Neustadt, P.C.

[57] ABSTRACT

Opal glass compositions for producing opal glass articles such as perfume bottles are disclosed. The compositions are borosilicate compositions and further include 0.5–3.0 wt % of CaO and 1.0–6.0 wt % of $P_2O_5$, and the sum of alkaline oxides totals 9–18 wt %.

12 Claims, No Drawings

OPAL GLASS COMPOSITIONS

The invention relates to compositions for opalescent glass, that is, compositions for the production of articles or substrates made of opalescent glass. Such articles or substrates are obtained in particular from compositions inducing the formation of microcrystals distributed in their thickness, imparting a more or less marked "clouded" and "cottony" appearance.

The perfume and cosmetics industries increasingly are demanding articles, such as bottles or jars, made of opalescent glass. The production of these articles has in particular the purpose of altering the presentation of the products deriving from these industries, in particular from an aesthetic point of view.

If the invention is not limited to such applications, it nonetheless will be described in greater detail in reference to the applications contemplated by the perfume and/or cosmetics industries, in particular in order to simplify the understanding thereof.

The inventors therefore set themselves the task of defining glass compositions for the production of articles made of opalescent glass.

Research led the inventors to produce such articles from glass compositions comprising in particular fluorine, an element capable of ensuring the germination of crystals. This research made it possible to produce such articles having opalescent, non-opaque walls having a satisfactory light transmission for the contemplated applications. On the other hand, aging tests for said articles under storage conditions similar to those to which they are intended to be subjected prior to filling revealed various problems.

To begin with, it was established that storage conditions in a confined atmosphere, the articles being subjected to fluctuations in temperature and humidity, lead to the formation of offensive, persistent odors, of the vinegar-odor type. The formation of such odors is, of course, completely unacceptable for the applications contemplated by the perfume and cosmetics industries.

Moreover, the aging conditions tested also disclosed the formation of a greasy gel on the surface of the glass. The formation of such a greasy film on the surface requires a washing and/or scouring of the articles prior to filling. These operations lead to very significant costs and, in addition, must be implemented by the filling industries and not by the container manufacturers, which also makes this drawback unacceptable.

During their analysis of the problems which have just been cited, the originators of this invention were able to demonstrate the assumed source of said problems. As a matter of fact, it would appear that the glass compositions used did not have a sufficient hydrolytic resistance.

The purpose of the invention thus is compositions for opalescent glass having an improved hydrolytic resistance, considering the results presented.

It furthermore is known to produce glass substrates comprising crystals in their thickness leading to a complete opacity; it involves substrates obtained from compositions of opaline glass. Such compositions are described in particular in patent application WO-96/06052. This application describes in particular the substitution of phosphorus-based compounds in place of fluorine-based compounds, in order to improve the coefficient of thermal expansion.

The previously set purpose is achieved according to the invention by a composition for opalescent glass of the borosilicate type including, in addition, the oxides below within the following limits by weight:

CaO: 0.5–3.0%
$P_2O_5$: 1.0–6.0%
and the sum of the alkaline oxides ranging between 9 and 18%.

The various glass compositions used corresponding to this definition in effect make it possible to produce articles having in particular a satisfactory hydrolytic resistance for applications such as those of interest to the perfume and/or cosmetics industries. As a matter of fact, bottles or jars do not have, after a storage under conditions such as those cited previously, any greasy film or any odor which may be detrimental to their use or requiring additional cleaning stages prior to filling.

Furthermore, the glass compositions, such as defined, may be melted, then put to use with no problem according to the customary techniques employed in the industry for manufacture of bottles and jars intended in particular for the perfume and cosmetic industries.

The principal and most important component in these glass matrices is $SiO_2$. The $SiO_2$ content advantageously ranges between 58 and 72% and preferably still is in excess of 60% and advantageously less than 66%. On this side of the lower limits, the glass compositions according to the invention become very problematic to work and the shaping of articles becomes almost unrealizable. On the other hand, above the upper limits, the glass compositions become difficult to melt.

With regard to $B_2O_3$ content, it advantageously is in excess of 8% and preferably in excess of 10% and advantageously does not go beyond 14% and preferably is below 12%. $B_2O_3$ acts somewhat in the growth of the microcrystals which one wishes to obtain. This element also makes it possible to reduce the viscosity at high temperatures.

The alkalines act on the one hand on the viscosity of the glass and on the other on the growth of the microcrystals. A low content of alkaline elements leads to high viscosities making melting and shaping of the glass more difficult. On the contrary, overly high contents lead to excessively low viscosities and in addition disrupt the growth of microcrystals. The alkaline content therefore is advantageously in excess of 10% and below 15%. These alkaline elements preferably are $Na_2O$ with a content advantageously ranging between 9 and 13% and $K_2O$ with a content ranging between 1.5 and 2.5%.

In addition to CaO, the compositions advantageously comprise other alkaline-earth elements such as BaO. These elements, in addition to their influence on viscosity, contribute essentially to the formation of microcrystals. More particularly, CaO essentially affects the nature of the crystals and BaO essentially affects their size. The BaO content by weight thus advantageously ranges between 1 and 4% and preferably is in excess of 2% and below 3%. With regard to the CaO content, it advantageously is below 1.5%.

In addition, the glass compositions according to the invention advantageously comprise ZnO oxide which also acts in the formation of microcrystals and more particularly on the rate of growth of these microcrystals. The ZnO content thus advantageously is selected below 3% and preferably in excess of 0.5% and preferably still below 1.5%.

The glass compositions according to the invention also advantageously may comprise $Al_2O_3$ oxide in a content advantageously below 10%. This oxide acts in particular on the chemical resistance of the glass as well as on its viscosity. In addition, low contents are detrimental to the growth of microcrystals and reduce chemical resistance. Overly high contents may lead to excessively high viscosities and a problematic melting. The $Al_2O_3$ content thus advantageously will be in excess of 5% and preferably below 8% and preferably still below 6%.

The glass compositions according to the invention also may comprise other oxides, in particular being capable of acting on the formation of microcrystals. It involves, for example, $CeO_2$ oxide which promotes in particular the germination of microcrystals with very low contents, such as contents below 1000 ppm.

The inventors also were able to demonstrate that the glass compositions according to the invention could comprise a not-negligible fluorine content to make up for that of $P_2O_5$, still without leading to articles which have the cited drawbacks, such as the formation of a greasy film or the presence of odors after storage. The fluorine content nonetheless advantageously remains below 1.5% and preferably below 1%.

According to a preferred mode of embodiment of the invention, the composition according to the invention comprises the components below within the following weight limits:

| | |
|---|---|
| $SiO_2$ | 60–66% |
| $Na_2O$ | 9–13% |
| $K_2O$ | 1.5–2.5% |
| CaO | 0.4–1.5% |
| $Al_2O_3$ | 5–6% |
| BaO | 2–3% |
| $Ce_2O$ | 0–0.1% |
| $B_2O_3$ | 10–12% |
| ZnO | 0.5–1.5% |
| F | 0–1% |
| $P_2O_5$ | 1.5–3% |

Previously it already was stated that the glass compositions thus described according to the invention allow for the production of articles having a sufficient hydrolytic resistance; in fact, this glass is comparable to a type 1 glass according to the rules of the European or American Pharmacopeia USP23-NF18. These rules are based on measurements of mass hydrolytic resistance, in particular by the over-powder or surface method.

In addition, these compositions for opalescent glass lead to articles having an overall light transmission through their wall. This light transmission is a function of the microcrystal content in the thickness of the wall of the article. It preferably is in excess of 10% and advantageously does not exceed 80%. According to the types of production, that is, according to the types of articles manufactured and their intended uses, light transmission in excess of 20%, or even 30% is advantageous. This light transmission may be expressed in particular in the form of L or luminance colorimetry, this magnitude being directly a function of light transmission. This magnitude L is one of the calorimetric coordinates designated by the letters a, b, L; a and b characterizing the chromaticity of the glass and L characterizing the luminance of this same glass, the coordinates in question deriving from the trichromatic coordinates X, Y and Z defined and proposed in 1931 by the Commission Internationale de l'Eclairage (CIE) [International Lighting Commission], a commission unanimously recognized as an authoritative agency in the area of colorimetry. The system of coordinates L, a, b commonly called CIELAB, was the subject of an official CIE recommendation in 1976 (Commission Internationale de l'Eclairage, Colorimetry—Official Recommendations— CIE Publication No. 15-2, VIENNA 1986) and is used by a large number of industrial sectors.

The measurement of calorimetric coordinates L, a, b is effected on a wall of an article. The measurements of transmission to determine the values a, b, L on the wall are carried out with the aid of an Interlab Colorquest spectrometer, under illuminant C, 2nd observing.

Concerning the manufacture of articles intended in particular for the perfume and cosmetics industry, the methods used for most of them are the usual manufacturing methods in the area of manufacture of bottles and jars. These manufacturing methods are usually automatic: the jars and bottles are produced, for example, on machines of the IS machine type.

Nonetheless, for example with respect to the manufacture of perfume bottles, certain articles may be produced in different manners. At the time of production of a bottle design, it usually is required that this bottle be produced on different scales. In fact, a perfume line consists of several forms, which may be, in particular, extracts, perfumes, colognes, toilet waters, samples, display dummies, etc. . . If the perfumes, colognes, toilet waters and samples are produced in large quantity, the same is not true in particular for the extracts and the display dummies. The articles produced in large quantity will be produced automatically on machines of the type of those cited previously. Concerning in particular the extracts and the display dummies, such production is difficult to plan, in particular for reasons of costs associated with adaptation of the machines and/or bulkiness of articles making the manufacture of these articles incompatible on such machines. The methods generally planned for this type of article then are termed "semiautomatic," that is, the production of these articles comprises stages involving one or several manual operators.

More particularly for this type of "semiautomatic" production, the invention provides for glass compositions having a greater working level and thus being more suited to a manual step at the time of production of the articles. In comparison with compositions according to the invention intended more particularly for an automatic production of articles, such compositions advantageously comprise a decreased silica content and increased alkaline, and more particularly $Na_2O$ and $P_2O_5$ contents. The variations in the $SiO_2$ and $Na_2O$ contents in particular make it possible to extend the working level. These variations entail in particular a lowering of the melting and refining temperatures. The variation in the $P_2O_5$ content essentially offsets the variation in $Na_2O$ to maintain the desired rate of microcrystal formation.

Preferably, in comparison with compositions intended more specifically for automatic manufacturing, the $SiO_2$ content is decreased by a value ranging between 3 and 6 expressed in percentage unit and preferably equal to 5. In the same manner, the alkaline and preferably $Na_2O$ content is increased by a value ranging between 3 and 6 expressed in percentage unit and preferably equal to 4.

Likewise again, the $P_2O_5$ is increased by a value ranging between 1 and 3 expressed in percentage unit and preferably equal to 1.

According to a variant of the invention, the compositions intended more particularly for "semiautomatic" manufacturing are characterized by an $SiO_2$ content ranging between 58 and 63%, an alkaline content ranging between 12 and 18%, more particularly with an $Na_2O$ content advantageously ranging between 10 and 13%, and a $P_2O_5$ content ranging between 2 and 6%.

Preferably, such compositions intended more particularly for "semiautomatic" manufacturing are characterized by an $SiO_2$ content ranging between 59 and 61%, an alkaline content ranging between 13 and 15%, and a $P_2O_5$ content ranging between 2.5 and 3%.

A composition for opalescent glass according to the invention, more particularly intended for an automatic production, may comprise the oxides below within the following weight limits:

| | |
|---|---|
| $SiO_2$ | 65.10% |
| $Na_2O$ | 9.00% |
| $K_2O$ | 2.02% |
| CaO | 1.05% |
| $Al_2O_3$ | 5.70% |
| BaO | 2.65% |
| $Ce_2O$ | 0.04% |
| $B_2O_3$ | 11.26% |
| ZnO | 0.93% |

| | |
|---|---|
| F | 0.45% |
| $P_2O_5$ | 1.80% |

A composition for opalescent glass according to the invention, intended more particularly for a "semiautomatic" production, comprising manual stages, may include the oxides below within the following weight limits:

| | |
|---|---|
| $SiO_2$ | 60.80% |
| $Na_2O$ | 12.4% |
| $K_2O$ | 2% |
| CaO | 1.1% |
| $Al_2O_3$ | 5.6% |
| BaO | 2.7% |
| $Ce_2O$ | 0.04% |
| $B_2O_3$ | 11.2% |
| ZnO | 0.9% |
| F | 0.5% |
| $P_2O_5$ | 2.6% |

As was stated previously, the compositions for opalescent glass intended more particularly for "semiautomatic" production as well as the compositions for opalescent glass intended more particularly for "automatic" production have a hydrolytic resistance similar to that of a type-1 glass and therefore satisfactory and a light transmission in excess of 10%.

Tests have been carried out based on different compositions for opalescent glass according to the invention and are reported in the table hereinbelow.

The table shows the glass composition for each of the articles produced as well as the L colorimetry through a wall of the articles, the latter having been cut beforehand to allow measurement.

| | No 1 | No 2 | No 3 | No 4 |
|---|---|---|---|---|
| $SiO_2$ | 60,99 | 60,41 | 60,44 | 60,13 |
| $Na_2O$ | 12,92 | 13,21 | 12,73 | 12,73 |
| $K_2O$ | 2,03 | 2,01 | 2,01 | 2,00 |
| CaO | 1,05 | 1,04 | 1,04 | 1,03 |
| $Al_2O_3$ | 5,66 | 5,61 | 5,61 | 5,58 |
| $Fe_2O_3$ | 0,03 | 0,03 | 0,03 | 0,03 |
| BaO | 2,65 | 2,63 | 2,63 | 2,61 |
| $Ce_2O$ | 0,04 | 0,04 | 0,04 | 0,04 |
| $B_2O_3$ | 11,22 | 11,12 | 11,12 | 11,06 |
| ZnO | 0,93 | 0,92 | 0,92 | 0,91 |
| F | 0,45 | 0,44 | 0,44 | 0,44 |
| $P_2O_5$ | 2,02 | 2,42 | 2,74 | 2,99 |
| L Colorimetry | 87,2 | 66,9 | 30,6 | 24,2 |

To begin with, these tests show that an increase in the $P_2O_5$ content leads to a decrease in light transmission. The light transmissions obtained from these glass compositions according to the invention are completely satisfactory for the contemplated applications.

In addition, the hydrolytic resistance for each of these glass types also is satisfactory, in particular for applications such as those of the perfume and cosmetics industries.

I claim:

1. Glass composition which comprises the components below within the following weight limits:

| | |
|---|---|
| $SiO_2$ | 60–66% |
| $Na_2O$ | 9–13% |
| $K_2O$ | 1.5–2.5% |
| CaO | 0.5–1.5% |
| $Al_2O_3$ | 5–6% |
| BaO | 2–3% |
| $Ce_2O$ | 0–0.1% |
| $B_2O_3$ | 10–12% |
| ZnO | 0.5–1.5% |
| F | 0–1% |
| $P_2O_5$ | 1.5–3%. |

2. Glass composition according to claim 1, which comprises the components below:

| | |
|---|---|
| $SiO_2$ | 65.10% |
| $Na_2O$ | 9.00%. |
| $K_2O$ | 2.02% |
| CaO | 1.05% |
| $Al_2O_3$ | 5.70% |
| BaO | 2.65% |
| $Ce_2O$ | 0.04% |
| $B_2O_3$ | 11.26% |
| ZnO | 0.93% |
| F | 0.45% |
| $P_2O_5$ | 1.80%. |

3. An opalescent borosilicate glass composition comprising at least $SiO_2$, $B_2O_3$, CaO, $P_2O_5$, and at least one alkali oxide, wherein the $SiO_2$ content ranges between 59 and 61%, the alkali oxide content ranges between 13 and 15%, the CaO content ranges between 0.5 and 3%, and the $P_2O_5$ content ranges between 2.5 and 3%.

4. Glass composition according to claim 3, which comprises the components below within the following weight limits:

| | |
|---|---|
| $SiO_2$ | 60.80% |
| $Na_2O$ | 12.4% |
| $K_2O$ | 2% |
| CaO | 1.1% |
| $Al_2O_3$ | 5.6% |
| BaO | 2.7% |
| $Ce_2O$ | 0.04% |
| $B_2O_3$ | 11.2% |
| ZnO | 0.9% |
| F | 0.5% |
| $P_2O_5$ | 2.6%. |

5. A jar or bottle made from the glass composition of claim 1.

6. A jar or bottle made from the glass composition of claim 2.

7. A jar or bottle made from the glass composition of claim 3.

8. A jar or bottle made from the glass composition of claim 4.

9. The jar or bottle of claim 5, wherein overall light transmission through a wall thereof ranges between 10 and 80%.

10. The jar or bottle of claim 6, wherein overall light transmission through a wall thereof ranges between 10 and 80%.

11. The jar or bottle of claim 7, wherein overall light transmission through a wall thereof ranges between 10 and 80%.

12. The jar or bottle of claim 8, wherein overall light transmission through a wall thereof ranges between 10 and 80%.

* * * * *